United States Patent
Wang et al.

(10) Patent No.: US 10,015,216 B2
(45) Date of Patent: Jul. 3, 2018

(54) METHODS AND SYSTEMS FOR VIRTUAL CONFERENCE SYSTEM USING PERSONAL COMMUNICATION DEVICES

(71) Applicant: QUALCOMM Incorporated, San Diego, CA (US)

(72) Inventors: Song Wang, San Diego, CA (US); Soumya Das, San Diego, CA (US); Sanghyun Chi, San Diego, CA (US); Karthika Paladugu, San Diego, CA (US); Soham Vikrambhai Sheth, San Diego, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/820,363

(22) Filed: Aug. 6, 2015

(65) Prior Publication Data
US 2017/0041357 A1 Feb. 9, 2017

(51) Int. Cl.
H04L 12/26 (2006.01)
H04L 29/06 (2006.01)
H04L 12/18 (2006.01)

(52) U.S. Cl.
CPC ........ H04L 65/403 (2013.01); H04L 12/1827 (2013.01); H04L 43/0852 (2013.01); H04L 65/4015 (2013.01)

(58) Field of Classification Search
None
See application file for complete search history.

(56) References Cited

U.S. PATENT DOCUMENTS 6,580,793 B1 6/2003 Dunn et al.
6,751,187 B2 6/2004 Walton et al.
(Continued)

FOREIGN PATENT DOCUMENTS

GB 2457254 8/2009
WO 2008043002 A2 4/2008
(Continued)

OTHER PUBLICATIONS

Vita J., et al., "Dynamic Adaptation of the Jitter Buffer for Video Streaming Applicants," IEEE 2nd Workshop on Advances in Information, Electronic and Electrical Engineering (AIEEE), Nov. 28, 2014, pp. 1-4, XP032729536, DOI: 10.1109/AIEEE.2014.7020318.
(Continued)

*Primary Examiner* — Ayaz R Sheikh
*Assistant Examiner* — Tarell A Hampton
(74) *Attorney, Agent, or Firm* — Paradice and Li LLP

(57) ABSTRACT

Systems and methods are described herein for providing a virtual conference using a master device implemented with a personal communication device (PCD), including determining, by the master device, a latency for each of a plurality of satellite devices connected to the master device. The master device then determines an uplink buffer duration based on a difference between a highest latency and a lowest latency among the plurality of satellite devices. The master device determines a processing time for an uplink data packet, the processing time being determined based, at least in part, on the uplink buffer duration. The master device then performs signal processing at the processing time for the received uplink data packets.

30 Claims, 10 Drawing Sheets

(56) References Cited

U.S. PATENT DOCUMENTS

| | | | |
|---|---|---|---|
| 7,143,177 B1* | 11/2006 | Johnson | H04L 12/1822 |
| | | | 348/E7.083 |
| 7,166,062 B1 | 1/2007 | Watterson et al. | |
| 7,551,647 B2 | 6/2009 | Fellman et al. | |
| 7,792,158 B1* | 9/2010 | Cho | H04J 3/0664 |
| | | | 370/350 |
| 7,949,890 B2 | 5/2011 | Vonog et al. | |
| 8,107,502 B2 | 1/2012 | Darras et al. | |
| 8,346,160 B2 | 1/2013 | Kummetz | |
| 8,391,320 B2 | 3/2013 | Lubbs et al. | |
| 8,422,409 B2 | 4/2013 | Guo et al. | |
| 8,645,741 B2 | 2/2014 | Vonog et al. | |
| 8,693,363 B2 | 4/2014 | Ericson et al. | |
| 8,873,543 B2 | 10/2014 | Hua et al. | |
| 8,990,305 B2 | 3/2015 | Barkley et al. | |
| 9,094,564 B2* | 7/2015 | Soldan | G06F 1/12 |
| 9,203,633 B2 | 12/2015 | Chu et al. | |
| 9,516,476 B2 | 12/2016 | Milosevski et al. | |
| 2002/0103919 A1* | 8/2002 | Hannaway | H04N 21/23406 |
| | | | 709/231 |
| 2002/0163932 A1* | 11/2002 | Fischer | H01R 13/641 |
| | | | 370/463 |
| 2003/0053416 A1 | 3/2003 | Ribas-Corbera et al. | |
| 2004/0006595 A1 | 1/2004 | Yeh et al. | |
| 2005/0058146 A1 | 3/2005 | Liu et al. | |
| 2005/0074061 A1 | 4/2005 | Ribas-Corbera et al. | |
| 2007/0021138 A1 | 1/2007 | Allen et al. | |
| 2007/0298823 A1 | 12/2007 | Sherif et al. | |
| 2008/0063216 A1* | 3/2008 | Sakata | H04R 27/00 |
| | | | 381/80 |
| 2008/0084900 A1* | 4/2008 | Dunn | H04L 47/70 |
| | | | 370/516 |
| 2008/0162127 A1 | 7/2008 | Laaksonen et al. | |
| 2008/0177893 A1 | 7/2008 | Bowra et al. | |
| 2008/0181260 A1 | 7/2008 | Vonog et al. | |
| 2008/0219259 A1 | 9/2008 | McDonald et al. | |
| 2008/0298266 A1 | 12/2008 | Chang et al. | |
| 2008/0298398 A1* | 12/2008 | Eidson | H04J 3/0685 |
| | | | 370/503 |
| 2008/0304653 A1* | 12/2008 | Ghani | H04M 9/08 |
| | | | 379/406.08 |
| 2009/0010228 A1 | 1/2009 | Wang et al. | |
| 2010/0034201 A1 | 2/2010 | Barave et al. | |
| 2010/0265834 A1 | 10/2010 | Michaelis et al. | |
| 2010/0323742 A1 | 12/2010 | Allen et al. | |
| 2011/0103377 A1 | 5/2011 | Hua et al. | |
| 2011/0187813 A1 | 8/2011 | Musgrave | |
| 2011/0200183 A1 | 8/2011 | Erhart et al. | |
| 2011/0258474 A1 | 10/2011 | Vonog et al. | |
| 2011/0262133 A1* | 10/2011 | Yuan | H04J 3/0667 |
| | | | 398/43 |
| 2012/0016926 A1 | 1/2012 | Toga et al. | |
| 2012/0082067 A1 | 4/2012 | Guo et al. | |
| 2012/0254649 A1 | 10/2012 | Vonog et al. | |
| 2012/0263195 A1* | 10/2012 | Li | G04G 7/02 |
| | | | 370/510 |
| 2012/0300769 A1 | 11/2012 | Narbutt | |
| 2012/0304079 A1 | 11/2012 | Rideout et al. | |
| 2012/0314598 A1 | 12/2012 | Sadek et al. | |
| 2012/0327173 A1 | 12/2012 | Couse et al. | |
| 2013/0002797 A1* | 1/2013 | Thapa | H04M 3/002 |
| | | | 348/14.01 |
| 2013/0106975 A1 | 5/2013 | Chu et al. | |
| 2013/0165173 A1 | 6/2013 | Allen et al. | |
| 2013/0195276 A1 | 8/2013 | Ojala et al. | |
| 2013/0222519 A1 | 8/2013 | Lee et al. | |
| 2014/0022332 A1 | 1/2014 | Wang et al. | |
| 2014/0028498 A1 | 1/2014 | Lin | |
| 2014/0064165 A1 | 3/2014 | Chung et al. | |
| 2014/0111604 A1 | 4/2014 | Vonog et al. | |
| 2014/0156592 A1 | 6/2014 | Bank et al. | |
| 2014/0164545 A1 | 6/2014 | Davis et al. | |
| 2014/0168354 A1 | 6/2014 | Clavel et al. | |
| 2014/0194059 A1 | 7/2014 | Milosevski et al. | |
| 2014/0320698 A1 | 10/2014 | Karivaradaswamy et al. | |
| 2014/0323036 A1* | 10/2014 | Daley | H04H 20/08 |
| | | | 455/3.06 |
| 2014/0376545 A1 | 12/2014 | Hua et al. | |
| 2015/0050967 A1* | 2/2015 | Bao | H04M 9/082 |
| | | | 455/570 |
| 2015/0113403 A1 | 4/2015 | Harvey et al. | |
| 2015/0120953 A1* | 4/2015 | Crowe | H04L 65/60 |
| | | | 709/231 |
| 2015/0222677 A1 | 8/2015 | Couse et al. | |
| 2015/0304607 A1 | 10/2015 | Bader-Natal et al. | |
| 2016/0014373 A1* | 1/2016 | LaFata | H04N 7/152 |
| | | | 348/14.08 |
| 2016/0019376 A1 | 1/2016 | Karaoguz et al. | |
| 2016/0134428 A1 | 5/2016 | Ouyang et al. | |
| 2016/0142840 A1 | 5/2016 | Das et al. | |
| 2016/0191258 A1 | 6/2016 | Oyman et al. | |
| 2016/0205155 A1 | 7/2016 | Rist et al. | |
| 2016/0302224 A1 | 10/2016 | Khairmode et al. | |
| 2017/0041252 A1 | 2/2017 | Das | |
| 2017/0041358 A1 | 2/2017 | Wang | |
| 2017/0295029 A1 | 10/2017 | Li et al. | |
| 2018/0091560 A1 | 3/2018 | Das et al. | |

FOREIGN PATENT DOCUMENTS

| | | |
|---|---|---|
| WO | 2009139903 A1 | 11/2009 |
| WO | 2014043405 A1 | 3/2014 |
| WO | 2016077251 A1 | 5/2016 |

OTHER PUBLICATIONS

International Search Report and Written Opinion—PCT/US2016/041196—ISA/EPO—datd Oct. 21, 2016.

* cited by examiner

METHODS AND SYSTEMS FOR VIRTUAL CONFERENCE SYSTEM USING PERSONAL COMMUNICATION DEVICES

CROSS-REFERENCE TO RELATED PATENT APPLICATIONS

This application relates to application to Ser. No. 14/820,371, titled METHODS AND SYSTEMS FOR VIRTUAL CONFERENCE SYSTEM USING PERSONAL COMMUNICATION DEVICES, and filed on Aug. 6, 2015, which is incorporated herein by reference, its entirety. This application also relates to application to Ser. No. 14/820,421, titled METHODS AND SYSTEMS FOR VIRTUAL CONFERENCE SYSTEM USING PERSONAL COMMUNICATION DEVICES, and filed on Aug. 6, 2015, which is incorporated herein by reference, its entirety. This application relates to provisional application No. 62/156,841, titled AUDIO SIGNAL ADJUSTMENT FOR MOBILE PHONE BASED PUBLIC ADDRESSING SYSTEM, and filed on May 4, 2015, which is incorporated herein by reference, its entirety.

BACKGROUND

1. Field

Embodiments described herein generally relate to a Virtual Conference System (VCS). In particular, this disclosure relates to using personal communication devices (PCDs) as input and output devices for the VCS.

2. Background

A traditional conference system in a given venue may include at least one display screen, microphone, and speaker. The displaying screen displays visual output to attendees in the venue. The microphone captures audio data. The speaker outputs audio data to the attendees in the venue. Various issues confront the traditional conference system. For example, depending on where each attendee is positioned in the venue, some attendees may not be able to see the display screen, access the microphone, or hear the speaker, due to distance or view obstruction. Furthermore, unavailability of the traditional conference system (e.g., when the traditional conference system fails to function or when the traditional conference system is not present in the venue) can prevent the conference from occurring at that venue. Therefore, the traditional conference system may produce negative user experience in various situations.

SUMMARY

Various embodiments relate to a method for providing a virtual conference using a master device implemented with a personal communication device (PCD), including determining, by a processor of the master device, a latency for each of a plurality of satellite devices connected to the master device, determining, by the processor of the master device, an uplink buffer duration based, at least in part, on a difference between a highest latency and a lowest latency among the plurality of satellite devices, determining, by the processor of the master device, a processing time for an uplink data packet, the processing time being determined based, at least in part, on the uplink buffer duration, and performing, by the processor of the master device, signal processing at the processing time for the received uplink data packets.

In some embodiments, the method further includes receiving the uplink data packet and an uplink timestamp associated with the uplink data packet from each of the plurality of satellite devices. The determining a processing time further includes determining a processing time for the uplink data packet further based, at least in part, on the uplink timestamp associated with the uplink data packet.

In some embodiments, the latency is determined by calculating a generation timestamp and a receiving timestamp of a previously-generated uplink data packet or a test packet.

According to various embodiments, the generation timestamp is the uplink timestamp of the previously-generated uplink data packet or a test packet.

In various embodiments, the uplink buffer duration is a predetermined margin plus the difference between the highest latency and the lowest latency.

In some embodiments, the margin is a frame.

In various embodiments, the method further includes generating, by the processor of the master device, an uplink data packet at the same uplink timestamp, wherein the processing time determined correspond to the uplink data packet generated by the master device.

In some embodiments, the signal processing is performed at the processing time for the received uplink data packets received from the satellite devices and the uplink data packet generated by the master device.

In various embodiments, the signal processing includes one or both of channel selection or channel mixing of at least the uplink data packets received from the satellite devices.

In various embodiments, the processing time is the uplink timestamp plus the uplink buffer duration.

In some embodiments, the latency includes a network-related latency and a local framework latency. The uplink timestamp is adjusted for the local framework latency.

According to some embodiments, the local framework latency may be determined by: outputting an audio bit stream at a generation timestamp, capturing sound signals including the bit stream outputted at a receiving timestamp, and determining the local framework latency based on a difference between the receiving timestamp and the generation timestamp.

In some embodiments, the bit stream is captured at the receiving timestamp when at least a portion of a pattern of the captured sound signals match with a pattern of the outputted bit stream at the receiving timestamp.

In some embodiments, the method further includes determining an ambience noise level associated with the master device, and proceeding with the latency determination, uplink buffer determination, uplink data reception, processing time determination, and signal processing when the ambience noise level is below a predetermined threshold.

In some embodiments, the method further includes prompting the user to move to a quiet location when the ambience noise level is above the predetermined threshold.

According to some embodiments, the uplink data packet is at least one of an audio packet or video packet.

In some embodiments, a non-transitory computer-readable medium having computer-readable instructions is described. When executed, a processor of a master device implemented with a PCD is caused to perform a process for providing a virtual conference, including: determining a latency for each of a plurality of satellite devices connected to the master device, determining an uplink buffer duration based, at least in part, on a difference between a highest latency and a lowest latency among the plurality of satellite devices, determining a processing time for an uplink data packet, the processing time being determined based, at least in part, on the uplink buffer duration, and performing signal processing at the processing time for the received uplink data packets.

According to some embodiments, the process further includes receiving the uplink data packet and an uplink timestamp associated with the uplink data packet from each of the plurality of satellite devices. The determining a processing time further includes determining a processing time for the uplink data packet further based, at least in part, on the uplink timestamp associated with the uplink data packet.

In some embodiments, the latency is determined by calculating a generation timestamp and a receiving timestamp of a previously-generated uplink data packet or a test packet.

In some embodiments, the generation timestamp is the uplink timestamp of the previously-generated uplink data packet or a test packet.

In some embodiments, the uplink buffer duration is a predetermined margin plus the difference between the highest latency and the lowest latency.

In various embodiments, the process further includes generating an uplink data packet at the same uplink timestamp, wherein the processing time is also determined for the uplink data packet generated by the master device.

In some embodiments, the signal processing is performed at the processing time for the received uplink data packets received from the satellite devices and the uplink data packet generated by the master device.

In some embodiments, the signal processing includes one or both of channel selection or channel mixing of at least the uplink data packets received from the satellite devices.

Various embodiments relate to a method for providing a virtual conference using a satellite device implemented with a PCD, including: obtaining a time offset with respect to a master clock maintained by a master device without changing a system clock of the satellite device, determining a first timestamp associated with an uplink data packet, wherein the first timestamp corresponds to the system clock of the satellite device, converting the first timestamp to a second timestamp using the time offset, wherein the second timestamp corresponds to the master clock, and transmitting the uplink data packet with the second timestamp to the master device.

In some embodiments, the second timestamp is adjusted for a local framework latency.

In various embodiments, the method further includes receiving a downlink playback delay from the master device.

In various embodiments, the method further includes receiving a downlink data packet and a downlink timestamp associated with the downlink data packet and outputting the downlink data packet.

In some embodiments, the outputting the downlink data packet includes outputting the downlink data packet based on the downlink timestamp and the downlink playback delay.

In some embodiments, a non-transitory computer-readable medium having computer-readable instructions is described. The computer readable instructions, when executed by a processor of a satellite device implemented with a PCD, causes the processor to perform a process for providing a virtual conference, including obtaining a time offset with respect to a master clock maintained by a master device without changing a system clock of the satellite device, determining a first timestamp associated with an uplink data packet, wherein the first timestamp corresponds to the system clock of the satellite device, converting the first timestamp to a second timestamp using the time offset, wherein the second timestamp corresponds to the master clock; and transmitting the uplink data packet with the second timestamp to the master device.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
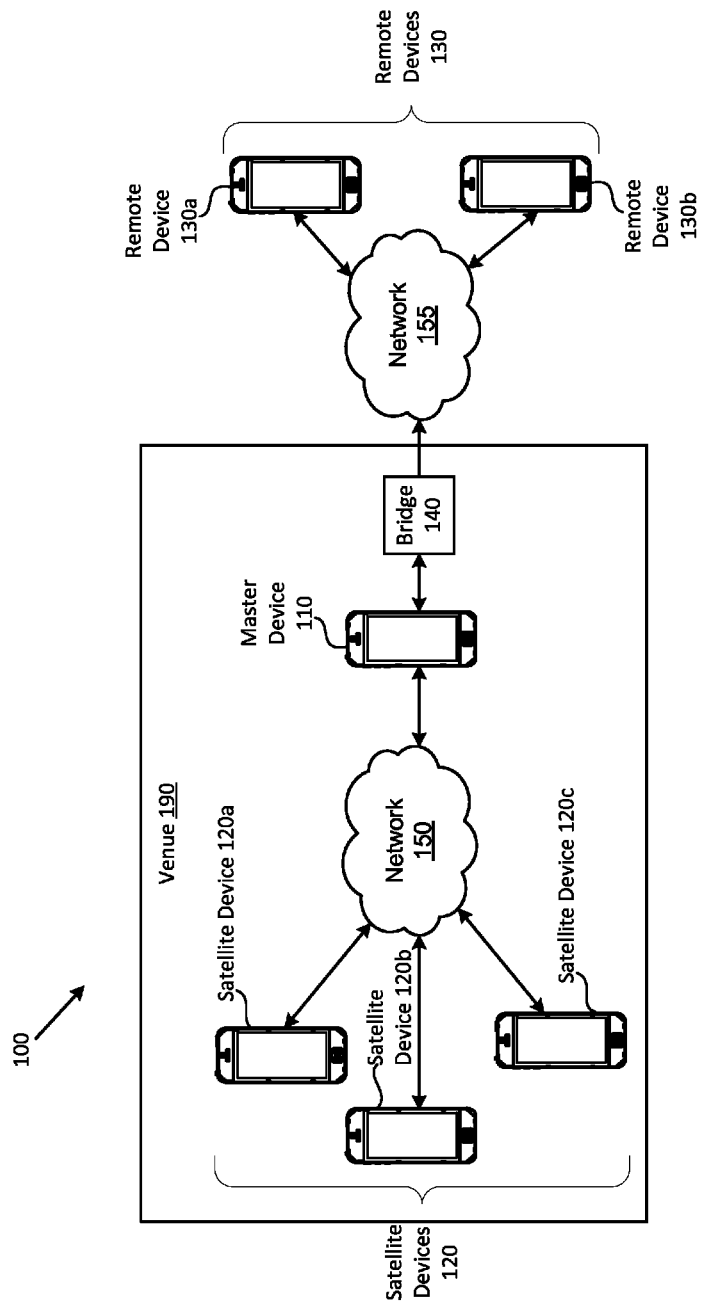
FIG. 1 is a diagram illustrating an example of a Virtual Conference System (VCS) according to various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Referring generally to the FIGS., a Virtual Conference System (VCS) may include satellite devices, remote devices, and a master device. Each of the satellite devices, remote devices, and master device may be implemented with a Personal Communication Device (PCD), such as, but not limited to, a mobile device, smartphone, and the like. The satellite device may be used for receiving and/or sending audio data with other users at a venue (e.g., a conference room or meeting site). For example, the satellite device may be used as a display, speaker, and microphone to achieve such purpose. The remote devices may be used similarly, but by users outside of the venue. The master device may receive audio/video data from satellite and/or remote devices. The master device may likewise capture audio/video data with its own microphone and camera. The master device may also relay (processed, mixed, filtered, and the like) audio/video data to the satellite devices and/or remote devices for outputting to the users of the satellite devices and the remote devices. The master device may centrally perform audio/video data processing functions such as mixing, reverberation control, channel selection, filtering, echo cancellation, buffer selection, and the like.

Accordingly, the VCS can be advantageous over any traditional conference system. In particular, given that PCDs are so pervasive, the conference can occur in any venue as long as the attendees/users have their PCDs with them. In addition, each attendee/user may closely perceive output data (e.g., visual data from the displays of the PCDs and audio data from the speaker of the PCDs). Therefore, the VCS as described herein can address the negative user experience of the traditional conference system, caused by an inability of the users to access audiovisual output or input.

To play back signals at satellite devices and master device without reverberation, the playback at the satellite devices and master device for downlink may need to be synchronized to account for offsets in local clocks between the devices. In addition for uplink, there may be synchronization for alignment of frames at the master device received from the satellite devices for mixing/selection. In addition, there may be de-jitter buffer to account for network-related and local framework latencies. The purpose of the synchronization is to avoid hearing the same content playing at different times by different satellite devices and the master device in the venue. Similarly, uplink signals originating from the satellite devices may also need to be synchronized for the master device to perform the described signal processing functions. Accordingly, the VCS may use one or more processes described below to synchronize signals at uplink and downlink to account for latencies.

In some embodiments, before a Real-Time Protocol (RTP) session is initiated between the satellite devices and the master device, each of the discovered satellite devices may perform an initial synchronization using timing protocols like Network Time Protocol (NTP) or Precision Time Protocol (PTP) or Simple Network Time Protocol (SNTP), to obtain a time offset with respect to the master device's clock without changing the system clocks of each of the satellite devices. In further embodiments, User Datagram Protocol (UDP) and Internet Protocol (IP) may be used. RTP, UDP, and IP may be used for media data. In other embodiments, other suitable protocols may be used such as, but not limited to, Hypertext Transfer Protocol (HTTP).

With the offset with respect to the master device known, each satellite device may calculate a playback time for received media frames in its own local timestamp regime (e.g., from the time of generation of the frames at the master device and the knowledge of the playback delta between the generation and the playback of media frames. The latter can be fixed or dynamic in which case it needs to be communicated within the media frame. The playback trigger may need to be adjusted to account for local framework latency for playback.

Uplink signals may be synchronized based on a time offset so that the master device may perform channel mixing and channel selection with synchronized uplink signals. A time offset with respect to the master clock may be determined for each satellite device. The master device may use a latency-adjusted RTP timestamp for the alignment of receive packets. Subsequently, the satellite devices and the master device may estimate local stack and framework latency.

Data packets (such as, but not limited to, media frames/packets) may also be generated in sequence by each satellite device. A uplink RTP sequence number may be assigned to each data packet. The data packets and the corresponding sequence number may be transmitted to the master device. The master device may align the received streams of data packets from different satellite devices based on the sequence number, to take into account network-related and local framework latency. RTP sequence number increments sequentially. Once the initial packets are align, the rest of the packets will be aligned as packets are generated with a fixed interval (e.g., 20 ms). Packet loss detection is done by noting gaps in the sequence numbers. The master device may then perform signal processing functions using the time-aligned audio data packets.

A local (loopback) latency may be determined by playing back a fixed and distinguishable bit stream of audio data. The satellite device may enable a microphone to capture the bit stream. The microphone-captured signals may be compared with the outputted signals for fixed and/or known pattern. When a fixed and/or known pattern from the outputted signals reappears in the captured signals, the time difference noted is the local loopback latency.

When satellite devices transmit media packets to the master device, the RTP timestamp is the master device's timestamp as perceived by the satellite devices (i.e., satellite device timestamp adjusted with the calculated offset). The master device may determine a total latency associated with each of the satellite device by determining the difference between the received timestamp and the generation timestamp of a test data packet as both are in the master device's time scale. The master device needs to maintain a buffer for mixing/selection. The buffer duration needs to be accounted for the variations in total latencies between all satellite device-master device media path (i.e., the difference between the maximum total latency (out of all the satellite devices and the master device) and the minimum total latency with a margin added.

While various embodiments described herein may relate to audio data, one of ordinary skill in the art can appreciate that systems and methods described herein may be similarly implemented for video data, or both.

FIG. 1 is a diagram illustrating an example of a VCS 100 according to various embodiments. Referring to FIG. 1, the VCS 100 may include of at least one satellite device (e.g., the satellite devices 120a-120c, collectively, the satellite devices 120), at least one remote device (e.g., the remote devices 130a-130b, collectively, the remote devices 130), and a master device 110. The master device 110 and the satellite devices 120 as well as the associated users may be physically located in a venue 190 (at least for the peer discovery process). For example, the master device 110 and the satellites devices 120 may be connected to the network 150 through a wireless access point that is physically located within the venue 190 (for the peer discovery process). The master device 110 may be coupled to or otherwise include a bridge 140. In some embodiments, the bridge 140 is physically located in the venue 190. In other embodiments, the bridge 140 is not physically located in the venue 190 but may be in communication with the master device 110.

In some embodiments, the master device 110 and the satellite devices 120 may be collected referred to as "near-end" devices. The remote devices 130 may be referred to as "far-end" devices. In such embodiments, the near-end devices may be centralized with respect to the master device 110. The master device 110 may connect to the virtual conference through the bridge 140, to which other parties (the far-end devices) may also be connected to. In addition, the far-end devices may also implement the master-satellite configuration of the near-end devices. For example, two or more master devices 110 may be connected to the bridge 140. Each of the master devices 110 may be connected to a separate group (i.e., in a separate venue 190) of satellite devices 120. In other embodiments, the master device 110 may also function as the bridge 140 and directly connected to the remote devices 130 via the network 155.

The satellite devices 120 and the master device 110 may be connected to one another through a network 150. The network 150 may be any wired or wireless network including, but not limited to, a WiFi network, Bluetooth network, Long Term Evolution (LTE) network (or other suitable types of mobile data network), a combination thereof, and/or the like. The remote devices 130 and the bridge 140 may be connected to one another through a network 155. The network 155 may be any wired or wireless network including, but not limited to, a WiFi network, Bluetooth network, LTE network (or other suitable types of mobile data network), a combination thereof, and/or the like. In some embodiments, the network 150 and the network 155 may be different networks. In other embodiments, the network 150 and the network 155 may be a same network. In some embodiments, the master device 110 and the bridge 140 may be connected to each other through the network 150. In other embodiments, the master device 110 and the bridge 140 may be connected to each other through the network 155 or another suitable network.

The venue 190 may be any suitable location that a conference can take place. For example, the venue 190 may refer to a meeting room, classroom, conference hall, lecture hall, and any suitable space in which a conference may be conducted. In addition, the venue 190 may be a space in which reverberation, howling, staggered sound, and the like may negatively impact the master device 110 and the satellite devices 120. The venue 190 may be occupied by at least the satellite devices 120, the master device 110, and their respective users (if any). The remote devices 130 (and their respective users), on the other hand, may be located anywhere outside of the boundaries of the venue 190. In particular, the users of the remote devices 130 may not be able to perceive output from the satellite devices 120.

Figure 2:
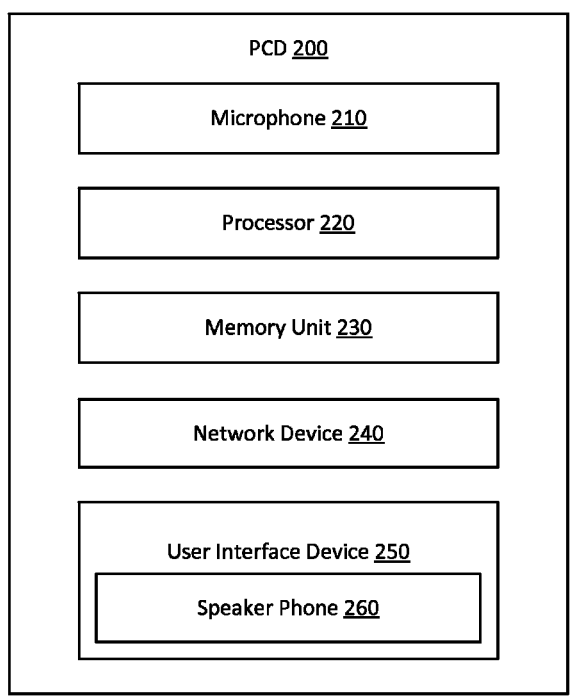
FIG. 2 is a block diagram illustrating an example of a Personal Communication Device (PCD) for implementation within the VCS according to various embodiments.

FIG. 2 is a block diagram illustrating an example of a PCD 200 for implementation in the VCS 100 according to various embodiments. Referring to FIGS. 1-2, one or more of the master device 110, satellite devices 120, and remote devices 120 may be implemented with the PCD 200. In particular embodiments, all of the master device 110, satellite devices 120, and remote devices 120 may be implemented with the PCD 200. The PCD 200 may be an electronic mobile device configured to capture and output audio data. In further embodiments, the PCD 200 may be configured to capture and output visual data (e.g., photographs, videos, and the like). Examples of the PCD 200 may include, but are not limited to, smartphones (mobile phones), pagers, tablets, PDAs, any mobile computing systems, and/or the like. The PCD 200 may be any mobile or non-mobile processor devices such as, but not limited to, a desktop computer, mainframe computer, laptop computer, and the like. The PCD 200 may include a microphone 210, processor 220, memory unit 230, network device 240, and a user interface device 250.

In some embodiments, the microphone 210 may be configured to capture sound from a user of the PCD 200 as the user speaks. In some embodiments, the microphone 210 may be integrated with the PCD 200 or otherwise housed inside of a housing of the PCD 200. In other embodiments, the at least one microphone 210 may be an auxiliary microphone not integrated with the PCD 200, but is operatively coupled to the PCD 200 in any suitable manner. The microphone 210 may capture Post Code Modulation (PCM) audio samples. Such PCM audio samples may be transmitted at uplink from the satellite devices 120 to the master device 110 through the network 150.

The processor 220 may be operatively coupled to the memory unit 230 for performing the functions of the PCD 200 described herein. For example, the processor 220 and the memory unit 230 may be configured to perform functions of the PCD 200 as described in the disclosure. The processor 220 may include any suitable data processing device, such as a general-purpose processor (e.g., a microprocessor). In the alternative, the processor 220 may be any conventional processor, controller, microcontroller, or state machine. The processor 220 may also be implemented as a combination of computing devices, e.g., a combination of a Digital Signal Processor (DSP) and a microprocessor, a plurality of microprocessors, at least one microprocessors in conjunction with a DSP core, or any other such configuration.

The memory unit 230 may be operatively coupled to the processor 220 and may include any suitable device for storing software and data for controlling and use by the processor 20 to perform operations and functions described herein, including, but not limited to, Random Access Memory (RAM), Read Only Memory (ROM), floppy disks, hard disks, dongles, or other Recomp Sensor Board (RSB) connected memory devices, or the like.

The network device 240 may include interface software and hardware for accessing the network 150 and/or the network 155 such that data may be transmitted and received via the network 150 and/or the network 155. The network device 240 may include at least one wireless receiver, transmitter, transceiver, and/or the like. The network device 240 may also include software providing a wireless or wireless communication link with the network 130.

The user interface 250 may include a display device and a user input device. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like. In particular embodiments, the display device of the user interface 250 may include a speaker (e.g., a speaker phone 260) for outputting sound and a display screen for outputting visual data.

The user input device may include any suitable device that may receive input from a user including, but not limited to one or more manual operator (such as, but not limited to a switch, button, touchscreen, knob, slider or the like), camera, image sensor, or the like. In particular embodiments, the user input device of the user interface 250 may include the camera for capturing visual data.

The PCD 200 may have existing hardware and software for telephone and other typical wireless telephone operations, as well as additional hardware and software for providing functions as described herein. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various signals, e.g., for global positioning system (GPS) communication, WiFi communication, code division multiple access (CDMA) communication, time division multiple access (TDMA), frequency division multiple access (FDMA), LTE communication, frequency modulation (FM) communication, BT communication, near field communication (NFC), and the like. In such embodiments, some of that existing electronics hardware and software may also be used in the systems and processes for functions as described herein.

Accordingly, such embodiments can be implemented with minimal additional hardware costs. However, other embodiments relate to systems and process that are implemented with dedicated device hardware specifically configured for performing operations described herein. Hardware and/or software for the functions may be incorporated in the PCD 200 during manufacturing, for example, as part of the original manufacturer's configuration of the PCD 200. In further embodiments, such hardware and/or software may be added to the PCD 200, after original manufacturing, such as by, but not limited to, installing one or more software applications onto the PCD 200. Generally, uplink data may be sent from the satellite devices 120 to master device 110, which then sends such data to the remote devices 130. Downlink data (originating from the remote devices 130) may be sent from the master device 110 to the satellite devices 120.

With respect to users of the satellite devices 120, audio signals may find their way into ears of the users of the satellite devices 120 in two paths: (1) a first path from the speaker's mouth directly into the user's ears, and (2) a second path from the speaker's mouth to the satellite device 120a, then through the network 150 to another satellite device 120b (which may output the audio data through the speakers to the user). This may cause reverberation or echo-like phenomenon that negatively impact user experience. In addition, howling may also be caused by the two different audio paths. The receiving satellite devices 120 may be physically isolated from a source signal (e.g., the speaker or other sound sources, the source satellite device such as the satellite device 120a, and the like).

The master device 110 may be configured to receive audio and/or visual data from the satellite devices 120. The master device 110 may select one of the satellite devices 120 for output. The master device 110 may also mix outputs from two or more of the satellite devices 120 for output. The selected and/or mixed channels may be outputted to the satellite devices 120 by the master device 110. In some embodiments, signals obtained from a selected satellite device may not be played back at the same selected satellite device. In other words, when a satellite device is selected by the master device 110, that satellite device does not play back the signals that it captured. The master device 110 may transmit an indication to the originating satellite device indicating that output data is not to be outputted. This can suppress echo-like output and howling at the selected satellite device. In other embodiments, when signals obtained from the selected satellite device may be played back at the same selected satellite device when the selected satellite device is acoustically isolated from the signal source (e.g., the speaker).

The VCS 100 may be configured for (1) obtaining time offset for each of the satellite devices 120 and the remote devices 130 with respect to the master device, (2) obtaining uplink and downlink delays for each of the satellite devices 120 and the remote devices 130, (3) synchronizing signals at uplink, and (4) synchronizing signals at downlink.

Given the complexity and the processing power of the PCD 200 as compared to simple microphone, speaker, and display in the traditional conferencing system, various aspects of a virtual conference may benefit from usage of the PCDs 200 and the master-satellite configuration. For example, as multiple satellite devices 120 may be present in the venue 190, the satellite device having the best audio quality (e.g., measured based on a signal-to-noise ratio (SNR) or the like) may be selected as the channel to be outputted to the other satellite devices 120 and the remote devices 130 at downlink. In some embodiments, the master device 110 may perform dual functions of the master device 110 and the satellite devices 120. In other embodiments, the master device 110 may perform purely signal processing functions and may not capture/output data.

Accordingly, the master device 110 may be a digital signal processing center for the near-end devices. In other words, the master device 110 may provide an interface for the satellite devices 120 with the bridge 140 (in turn, the remote devices 130). For the near-end devices, the bridge 140 may only need to interface with the master device 110 while still benefit from advantages of using the satellite devices 120 (the PCDs 200) as microphone and/or display.

Figure 3:
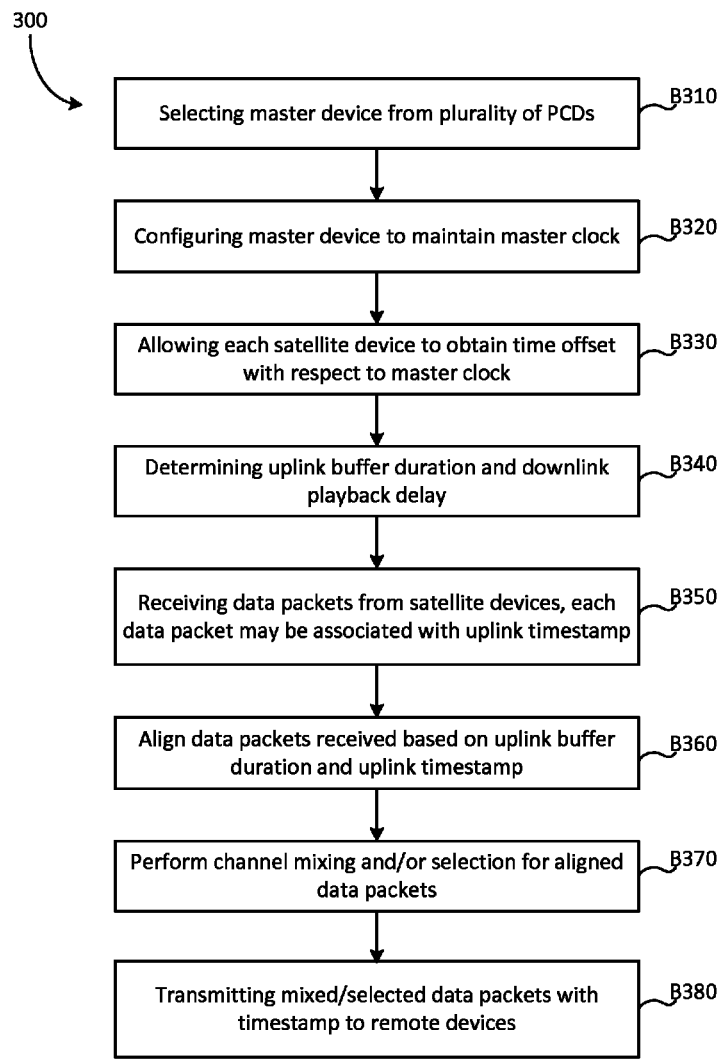
FIG. 3 is a process flowchart diagram illustrating an example of a process for conducting a virtual conference according to various embodiments.

FIG. 3 is a process flowchart diagram illustrating an example of a process 300 for conducting a virtual conference according to various embodiments. Referring to FIGS. 1-3, the process 300 may be implemented for the VCS 100, in which at least the master device 110 and the satellite devices 120 may be implemented with the PCD 200. The process 300 may be implemented for the master device 110.

At block B310, the master device 110 may be selected from a plurality of PCDs (each of which may be the PCD 200). Each of the plurality of PCDs (i.e., near-end devices) may be in communication with one another, by virtue of being connected to a same network (the network 150) and/or by virtue of a suitable peer discovery process. The peer discovery process may discover and group all PCDs that have indicated a desire by their respective users (through the input device of the user interface 250) to join a conference session.

In one embodiment, the master device 110 may be selected when the user of the master device 110 indicates, via the input device of the user interface 250, a desire to be the master device 110 for the current conferencing session. In another embodiment, the master device 110 may be selected from among the plurality of PCDs based on processing power, memory, (battery) power state, ability to cancel echo, local latency, and/or network latency with respect to each of the plurality of PCDs. Particularly, the master device 110 may be selected when it has enough battery power to last for a predetermined period of time (e.g., through the entire session). For example, the PCD with the highest processing power and/or lowest local/network latency may be selected as the master device 110. In some embodiments, the user of the master device 110 may not be notified (via the user input device 250) that the device is being used as the master device 110. In other embodiments, the user of the master device 110 may be notified (via the user input device 250) that the device is being used as the master device 110.

The unselected PCDs may be designated as the satellite devices 120 by default. In particular embodiments, the unselected PCDs may be designed as the satellite devices when the unselected PCDs are within the boundary of the venue 190 or due to the fact that they are grouped together by the peer discovery process. The satellite devices 120 may still be designated as satellite devices 120 even the satellite devices 120 is physically outside of the geographical boundaries of the venue 190, given that the satellite devices 120 have already been tied to the master device 110 after the peer discovery process. In other embodiments, once one of the satellite devices 120 have been detected to be outside of the geographical boundaries of the venue 190 (through wireless signal triangulation, Global Positioning System (GPS) indication, and the like), that device may be disassociated with the master device 110 and is no longer one of the satellite devices 120.

At block B320, the master device 110 may be configured to maintain a master clock according to various embodiments. The processor 220 of the master device 110 may be configured with a suitable type of network time protocol for clock synchronization. In particular, the selected master device 110 may be configured to be a local NTP server, supporting NTP and/or simple NTP (SNTP), PTP, or any other timing protocols.

At block B330, the master device 110 may allow each of the satellite devices 120 to obtain a time offset with respect to the master clock maintained by the master device 110. For example, the satellite devices 120 and the master device 110 may be engaged in NTP or SNTP activities for synchronization before any uplink audio/video data packets are sent for the conference session. After such initial synchronization, the master device 110 may periodically (e.g., every 1 second, 5 seconds, 10 seconds, 1 minutes, or the like) allow the satellite devices 120 to synchronize to the master clock. Accordingly, each of the satellite devices 120 may be have a time offset with respect to the master clock. The time offset may be different for each of the satellite devices 120. In some embodiments, the master device 110 may store the time offsets of the satellite devices 120 in the memory unit 230. In other embodiments, the master device 110 may not need to store the time offsets.

At block B340, the master device 110 may determine an uplink buffer duration (for mixing selection of uplink frames from different satellite devices 120) and downlink playback delay (for the satellite devices 120), as described. The uplink data packets/frames (transmitted from the satellite devices 120 to the master device 110 and captured by the master device 110 itself) may be synchronized at uplink by the master device 110 for channel selection and mixing by the master device 110. Such uplink data packets may be aligned using the uplink buffer duration in the manner described by the master device 110. The downlink data packets/frames (transmitted from the master device 110 to the satellite devices 120) may be aligned at each of the satellite devices 120 for synchronized playback using the downlink playback delay.

At block B350, the master device 110 may receive uplink data packets from each of the satellite devices 120. At block B350, the active conference session (e.g., the RTP session or other suitable types of sessions) may be initiated. The data packets may be audio data or video data. In some embodiments, each data packet received may be associated with an uplink timestamp.

In one embodiment, each of the satellite devices 120 may determine the uplink timestamp for a corresponding data packet according to the master clock. For example, each of the satellite devices 120 may calculate its own internal clocks biased with the obtained time offset with respect to the master clock. Accordingly, when the master device 110 receives the data packets and the associated uplink timestamps from the satellite devices 120, the uplink timestamps may already be based on the master clock such that no further conversion may be necessary by the master device 110. In such embodiment, the time offsets may not need to be stored by the master device 110.

Alternatively, each of the satellite devices 120 may determine the uplink timestamp for a corresponding uplink data packet according to its own clock (instead of the master clock). When the master device 110 receives the uplink data packets and the associated uplink timestamps from the satellite devices 120, the master device 110 may convert the uplink timestamp to conform to the master clock using the time offsets stored in the memory unit 230. The master device 110 may also generate uplink data packets like the satellite devices 120.

At block B360, the master device 110 may align the received uplink data packets based on the uplink buffer duration and the uplink timestamp associated with each of the received uplink data packets. In one particular embodiments, all uplink data packets (from the master device 110 and the satellite devices 120) received that correspond to the same uplink timestamp (all corresponding to the master clock) may be considered for channel selection/mixing at a time $$Tf=Tts+Tub; \quad (1)$$

where Tf is the channel selection/mixing (processing) time, Tts is the uplink timestamp, and Tub is the uplink buffer duration.

At block B370, the master device 110 may perform channel mixing and/or channel selection for the aligned data packets. At block B380, the master device 110 may transmit the mixed and/or selected data packets (as determined at block B380) with a timestamp (corresponding to the master clock) to the remote devices 130 (and in further embodiments, the satellite devices 120 in an acoustically isolated scenario as described).

Figure 4:
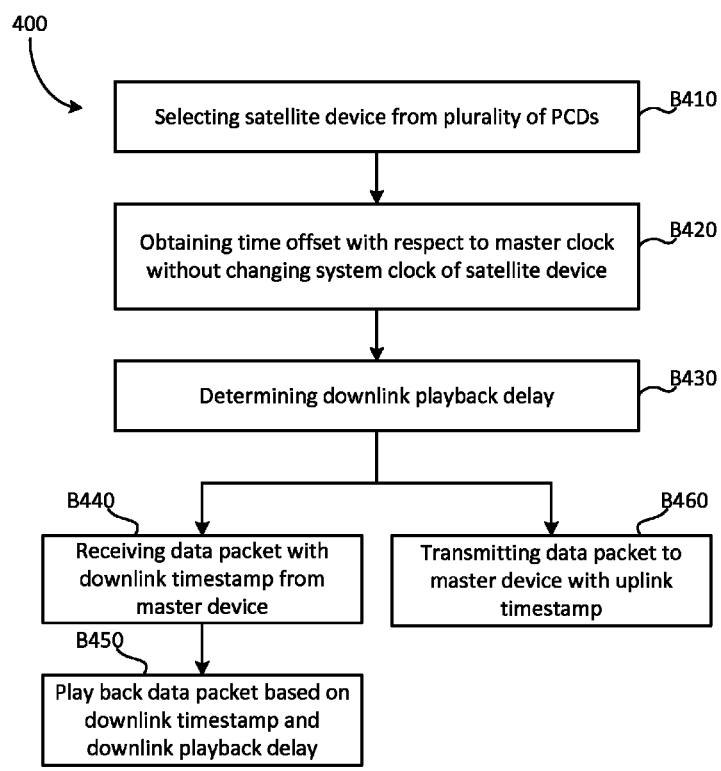
FIG. 4 is a process flowchart diagram illustrating an example of a process for conducting a virtual conference according to various embodiments.

FIG. 4 is a process flowchart diagram illustrating an example of a process 400 for conducting a virtual conference according to various embodiments. Referring to FIGS. 1-4, the process 400 may be implemented for the VCS 100, in which at least the master device 110 and the satellite devices 120 may be implemented with the PCD 200. The process 400 may be used by one (e.g., the satellite device 120*a*) of the satellite devices 120.

At block B410, the satellite device 120*a* may be selected from the plurality of PCDs (each of which may be the PCD 200) in the manner described. At block B420, the satellite device 120*a* may obtain a time offset with respect to the master clock without changing the system clock of that satellite device 120*a*. For example, the satellite device 120*a* may be engaged in NTP or SNTP (or other suitable activities as described) activities for synchronization before any audio/video data packets are sent for the conference session. Thereafter, the satellite device 120*a* may periodically (e.g., every 1 second, 5 seconds, 10 seconds, 1 minutes, or the like) engage in the NTP or SNTP (or other suitable protocols as described) synchronization processes. The time offset may be stored in the memory unit 230 of the satellite device 120*a*. However, the system time of the satellite device 120*a* may not be changed, in consideration of other processes and applications (e.g., mobile phone applications) executed on the satellite device 120*a*. In some cases, applications on the satellite device 120*a* may not be allowed to change the system time.

At block B430, the satellite device 120*a* may determine the downlink playback delay in. In some embodiments, the satellite device 120 may receive the downlink playback delay from the master device 110 before receiving the downlink data packet or with the downlink data packet. The master device 110 may receive a downlink receiving timestamp (using the time offset for master clock correspondence) from each of the satellite devices 120 corresponding to a time at which a previous downlink data packet or a test data packet was received. The master device 110 may determine the downlink playback delay to be the maximum of a difference between the downlink receiving timestamp and the downlink timestamp among the satellite devices 120. In further embodiments, the master device 110 may add a downlink margin to the maximum difference. The downlink margin may be, for example, half a frame (10 ms), a frame (20 ms), two frames (40 ms), or the like.

At block B440, the satellite device 120*a* may receive the downlink data packet with the downlink timestamp from the master device 110. The downlink timestamp may key off the master clock. The satellite device 120*a* may calculate the downlink timestamp in its own time based on the time offset stored in the memory unit 230.

At block B450, the satellite device 120*a* may play back (via the user interface device 250) the received downlink data packet based on the downlink timestamp and the downlink playback delay. For example, after the satellite device 120*a* converts the received downlink timestamp to its own time, the satellite device 120*a* may play back the received downlink data packet at a time $$Tpbs1 = Tg + OFF1 + \Delta T; \quad (2)$$

where Tpbs1 is the playback time for the satellite device 120*a*, Tg is the downlink timestamp, OFF1 is the offset for the satellite device 120*a*, and ΔT is the downlink playback delay. For example, Tg+OFF1 refers to the system time of the satellite device 120*a*. Similarly, the master device 110 may play back (via the user interface device 250) the same data packet at a time $$Tpbm = Tg + \Delta T; \quad (3)$$

where Tpbm is the playback time for the master device 110, where Tpbm is equal to Tpbs1.

At block B460, the satellite device 120*a* may transmit the uplink data packet to the master device 110 with the uplink timestamp. In one embodiment, satellite device 120*a* may determine the uplink timestamp for a corresponding data packet according to the master clock. For example, each of the satellite device 120*a* may calculate its own internal clock biased with the obtained time offset with respect to the master clock. Accordingly, when the master device 110 receives the data packet and the associated uplink timestamp from the satellite device 120*a*, the uplink timestamp may already be based on the master clock such that no further conversion may be necessary by the master device 110.

Alternatively, satellite device 120*a* may determine the uplink timestamp for a corresponding data packet according to its own clock (instead of the master clock). When the master device 110 receives the data packet and the associated uplink timestamp from satellite device 120*a*, the master device 110 may convert the uplink timestamp to conform to the master clock using the time offsets stored in the memory unit 230.

Given that the uplink (block B460) and downlink (block B440-B450) may be independent of one another, the uplink and downlink processes of the satellite device 120*a* may be executed simultaneously.

For a satellite device that joins the active conference session after the session has already been initiated, block B420 may be executed after peer discovery. Thereafter, the newly joined satellite device may proceed to blocks B430-B460.

Figure 5:
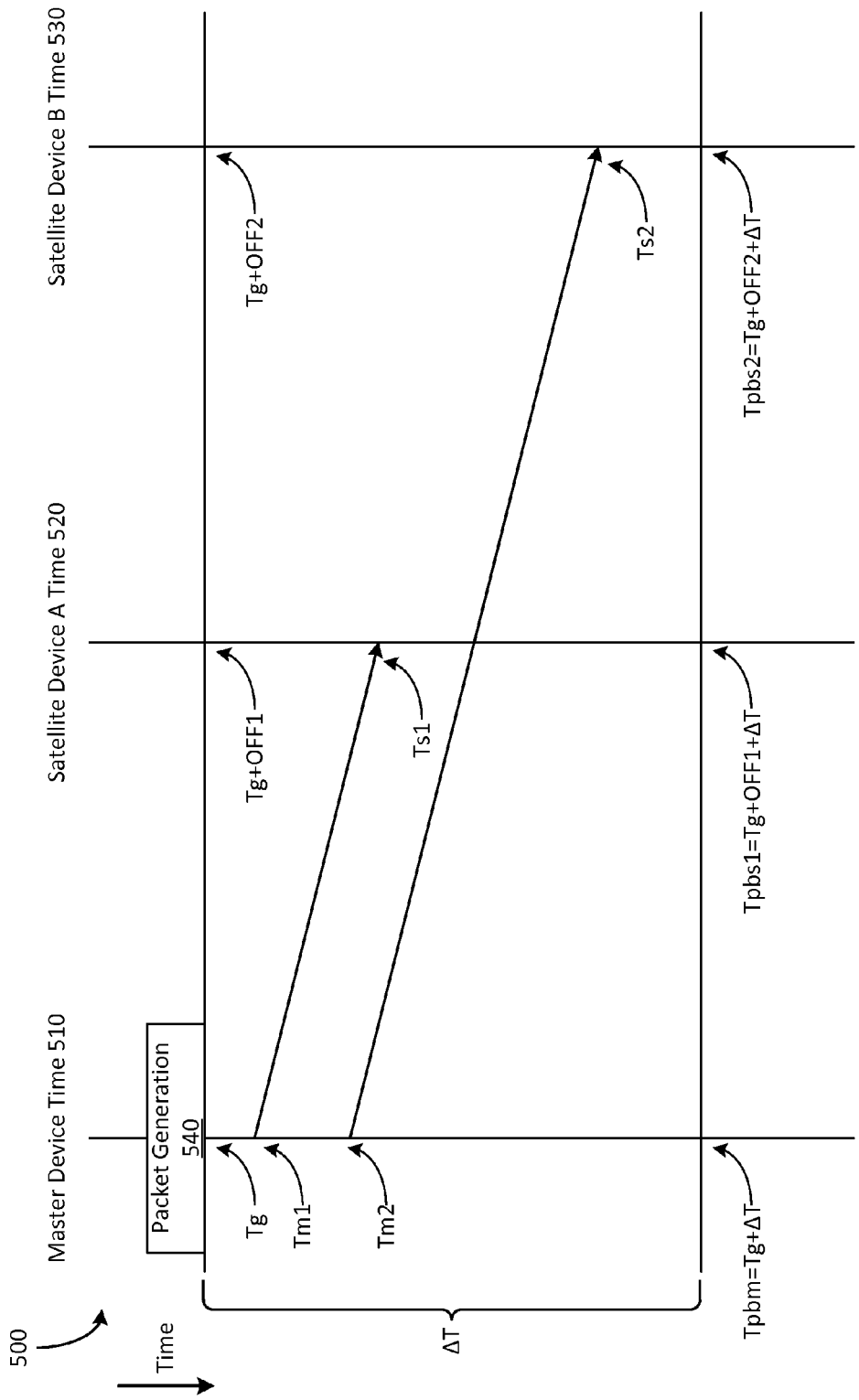
FIG. 5 is a diagram illustrating an example of a downlink playback synchronization process according to various embodiments.

FIG. 5 is a diagram illustrating an example of a downlink playback synchronization process 500 according to various embodiments. Referring to FIGS. 1-5, the master device time 510 may correspond to the system time of the master device 110. The satellite device A time 520 may correspond to the system time of the satellite device 120*a*. The satellite device B time 530 may correspond to the system time of the satellite device 120*b*. In particular, the master device time 510 may equal to the satellite device A time 520 biased with the offset (OFF1) for the satellite device 120*a*. The master device time 510 may also equal to the satellite device B time 530 biased with an offset (OFF2) for the satellite device 120*b*. Each of the OFF1 and OFF2 may be positive or negative.

In packet generation 540, the downlink data packet may be generated by the master device 110 (i.e., as a result of the block B370), at a time Tg. Tg may be used as the downlink timestamp at block B380. At time Tm1, the master device 110 may transmit (at block B380) the downlink data packet with the downlink timestamp Tg to the satellite device 120*a*, which may receive (at block B440) the downlink data packet and the downlink timestamp Tg at Ts1 (satellite device A time 520). At time Tm2, the master device 110 may transmit (at block B380) the downlink data packet with the downlink timestamp Tg to the satellite device 120*b*, which may receive (at block B440) the downlink data packet and the downlink timestamp Tg at Ts2 (satellite device B time 530).

Each of the satellite devices 120*a* and 120*b* may convert Tg to their respective system times. For example, Tg (master clock) may correspond to Tg+OFF1 for satellite device A time 520. Tg (master clock) may correspond to Tg+OFF2 for satellite device B time 530. After the conversion, each of the satellite devices 120*a* and 120*b* may apply the downlink playback delay (ΔT) for the playback. For example, the satellite device 120*a* may play back the downlink data packet at Tpbs1, which is equal to Tg+OFF1+ΔT. The satellite device 120*b* may play back the downlink data packet at Tpbs2, which is equal to Tg+OFF2+ΔT.

ΔT may be predetermined and sent to each of the satellite devices 120 at the initiation of the active conference session. Alternatively, ΔT may be sent with the downlink data packet. In either cases, the master device 110 may receive downlink receiving timestamps Ts1 and Ts2 (using the time offset for master clock correspondence) from each of the satellite devices 120*a* and 120*b* corresponding to a time at which a previous downlink data packet or a test data packet was received. The master device 110 may determine the downlink playback delay (ΔT) to be the maximum of a difference between the downlink receiving timestamps (Ts1 and Ts2) and the downlink timestamp (Tm) among the satellite devices 120. In further embodiments, the master device 110 may add a downlink margin to the maximum difference. The downlink margin may be, for example, half a frame (10 ms), a frame (20 ms), two frames (40 ms), or the like.

Figure 6:
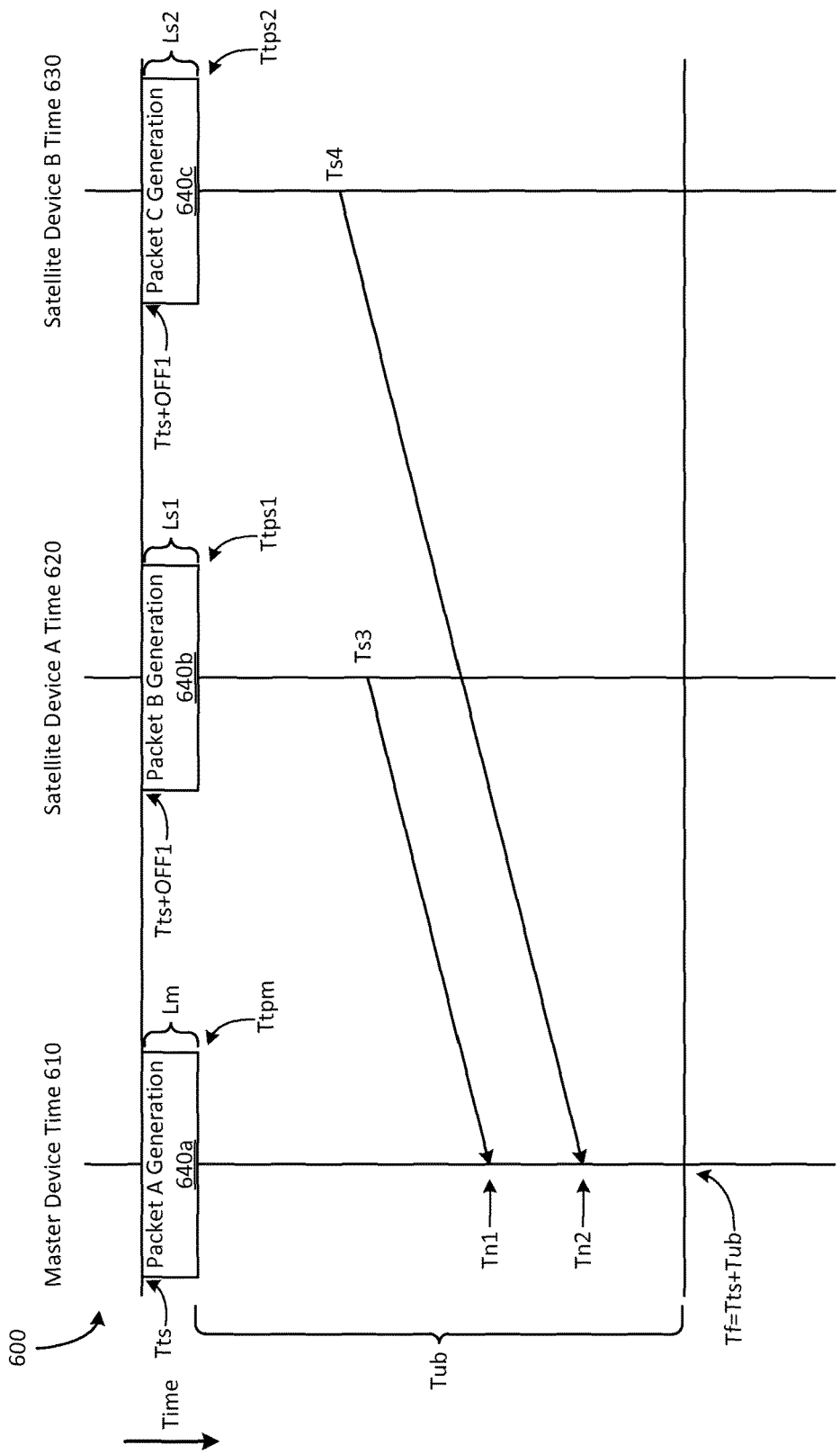
FIG. 6 is a diagram illustrating an example of a uplink synchronization process according to various embodiments.

FIG. 6 is a diagram illustrating an example of a uplink synchronization process 600 according to various embodiments. Referring to FIGS. 1-6, the master device time 610 may correspond to the system time of the master device 110. The satellite device A time 620 may correspond to the system time of the satellite device 120a. The satellite device B time 630 may correspond to the system time of the satellite device 120b. In particular, the master device time 610 may equal to the satellite device A time 620 biased with the offset (OFF1) for the satellite device 120a. The master device time 610 may also equal to the satellite device B time 630 biased with an offset (OFF2) for the satellite device 120b. As described, each of the OFF1 and OFF2 may be positive or negative.

In packet A generation 640a, a first uplink data packet may be generated (at block B350) by the master device 110, at a time Tts with respect to the master device time 610. In packet B generation 640b, a second uplink data packet may be generated by the satellite device 120a, at a time Tts+OFF1 with respect to the satellite device A time 620. In packet C generation 640c, a third uplink data packet may be generated by the satellite device 120b, at a time Tts+OFF2 with respect to the satellite device B time 630. All of the first, second, and third uplink data packet may be generated at Tts with respect to the master device time 610. Each of the satellite devices 120a and 120b may determine the uplink timestamp (Tts) with respect to the master device time 610 using OFF1 and OFF2. The packet A generation 640a, packet B generation 640b, and packet A generation 640c may be generated using the microphone 210 (for audio data) and a camera (for visual data) of the user interface device 250 of their respective devices.

At time Ts3, the satellite device 120a may transmit (at block B460) the second uplink data packet with the uplink timestamp Tts to the master device 110, which may receive (at block B350) the second uplink data packet with the uplink timestamp Tts at Tn1 (master device time 610). At time Ts4, the satellite device 120b may transmit (at block B460) the third uplink data packet with the uplink timestamp Tts to the master device 110, which may receive (at block B350) the third uplink data packet with the uplink timestamp Tts at Tn2 (master device time 610).

After receiving the second and third uplink data packets, the master device 110 may align (at block B360) the first, second, and third uplink data packets at Tf. As described, Tf is determined by adding the uplink timestamp Tts and the uplink buffer duration Tub.

Figure 7:
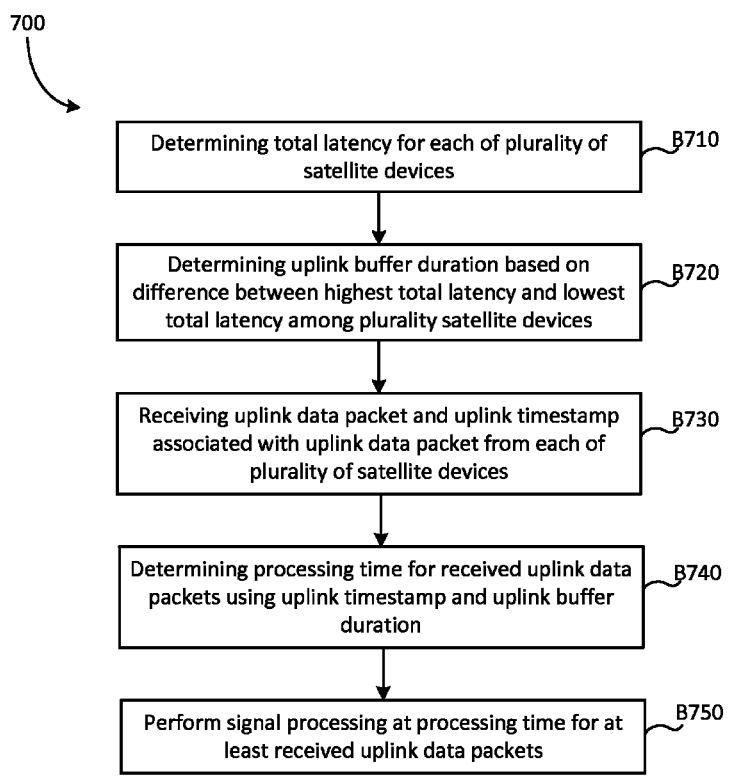
FIG. 7 is a process flowchart diagram illustrating an example of a process for selecting an uplink buffer duration according to various embodiments.

FIG. 7 is a process flowchart diagram illustrating an example of a process 700 for selecting the uplink buffer duration (Tub) according to various embodiments. Referring to FIGS. 1-7, the process 700 may be executed by the master device 110 of the VCS 100 to determine the uplink buffer duration at block B340.

At block B710, the master device 110 may determine a total latency for each of the satellite devices 120. In particular, the total latency (TL) may be a combination of network-related latency (W) and local framework latency (L) (i.e., TL=W+L). The network-related latency may be related to the latency associated with the network 150 with respect to each of the satellite devices 120. The network-related frequency may be different for each of the satellite devices 120 depending on the manner in which each of the satellite devices are connected to the network 150. The local framework latency may be related to signal processing latency particular to each of the satellite devices 120. Therefore the local framework latency may be different for each of the satellite devices 120 based on maker, model, manufacturing, and the like. For the master device 110, the network-related latency is 0.

The master device 110 may determine the total latency for each of the satellite devices 120 by determining the time difference between a generation timestamp of a previously-generated uplink data packet (or a test packet) originating from each of the satellite devices 120 and the received timestamp of the previously-generated uplink data packet (or a test packet) as received by the master device 110. The generation timestamp may be the uplink timestamp (Tts) for the previously-generated uplink data packet or the test packet. For example, as shown in particular in FIG. 6, the total latency for the satellite device 120a may be determined by calculating the difference between Tn1 and Tts. In another example, the total latency for the satellite device 120b may be determined by calculating the difference between Tn2 and Tts. Given that the generation timestamp is already in the master device time 610, no further conversion may be needed by the master device 110. Otherwise, the master device 110 may convert the generation timestamp to the corresponding master device time 610.

At block B720, the master device 110 may determine the uplink buffer duration based on the difference between the highest total latency and the lowest total latency among the satellite devices 120. In particular embodiments, the uplink buffer duration may be determined based on:

$$Tub = [\text{Max}(TL) - \text{Min}(TL)] + \text{Margin};$$ (4)

Where Max(TL) represents the highest total latency among the satellite devices 120, Min(TL) represents the lowest total latency among the satellite devices 120, and Margin is a predetermined time interval added. Example of the margin may include, but not limited to, 10 ms (half a frame), 20 ms (one frame), 40 ms (two frames), and the like. The margin may be determined based on channel condition of the network 150.

Accordingly, the uplink buffer duration may be determined based on the difference between the highest total latency and the lowest total latency, instead the highest total latency.

At block B730, the master device 110 may receive an uplink data packet and an uplink timestamp (Tts) associated with the uplink data packet from each of the satellite devices 120, for example, at block B350. The uplink data packets received may include the uplink data packets generated at the Packet B generation 640b and the packet C generation 640c. In addition, the master device 110 may also generate uplink data packet at the same uplink timestamp (at the packet A generation 640a).

At block B740, the master device 110 may determine a processing time for the received uplink data packets using the uplink timestamp and the uplink buffer duration. In some embodiments, the same processing time may also correspond the uplink data packet generated by the master device 110, at the same uplink timestamp. The processing time (Tf) may be a time at which the master device 110 will perform signal processing functions such as, but not limited to, channel selection and channel mixing for the uplink data packets received from the satellite devices 120 and generated by the master device 110.

In particular, the processing time is a time indicated by the uplink timestamp plus the uplink buffer duration.

At block B750, the master device 110 may perform signal processing at the processing time for at least the received uplink data packets (as well as the uplink data packet generated by the master device 110).

In some embodiments, the uplink buffer duration may be determined using the current uplink data packets and uplink timestamp (received at block B730), instead of the previously-received uplink data packets or the test packet. That is, block B720 and B730 may be switched. After receiving the current uplink data packets and uplink timestamp at block B730, the master device 110 may determine the uplink buffer duration at block B720 using for the current uplink data packets and uplink timestamp, instead of the previously-received uplink data packets or the test packet, and the uplink timestamp associated therewith. In various embodiments, the local and framework latencies may be determined after synchronization is executed.

Figure 8:
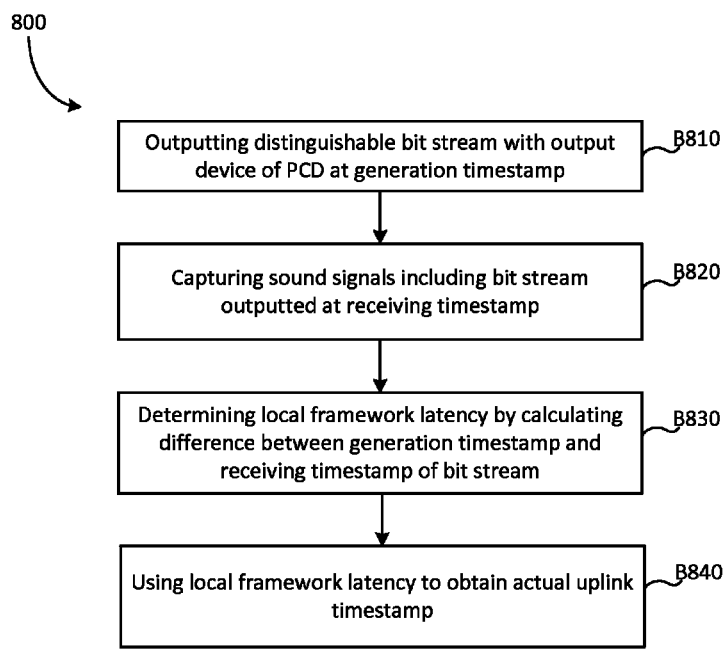
FIG. 8 is a process flowchart diagram illustrating an example of a process for determining an actual uplink timestamp according to various embodiments.

FIG. 8 is a process flowchart diagram illustrating an example of a process 800 for determining an actual uplink timestamp (Tts) according to various embodiments. Referring to FIGS. 1-8, the process 800 may be executed by the master device 110 and/or the satellite devices 120 (referred to as the PCD 200) of the VCS 100.

Each PCD 200 may have a local framework latency (L). For example, as shown in FIG. 6, the master device 110 may have a master local framework latency (Lm). The satellite device 120a may have a first satellite framework latency (Ls1). The satellite device 120b may have a second satellite framework latency (Ls2). Even though the packets generated 640a, 640b, and 640c may be associated the uplink timestamp (Tts) at a moment of generation, given the local framework latency L associated with the PCDs 200, each PCD 200 may measure a delayed uplink timestamp. For example, the master local framework latency may cause the master device 110 to measure generation time at the delayed uplink timestamp (Ttpm). The first satellite framework latency may cause the satellite device 120a to measure generation time at the delayed uplink timestamp (Ttps1). The second satellite framework latency may cause the satellite device 120b to measure generation time at the delayed uplink timestamp (Ttps2).

Each of the master device 110 and the satellite device 120 (i.e., each PCD 200) may be configured to determine its own local framework latency. At block B810, the PCD 200 may output a distinguishable audio bit stream with the output device (e.g., the speaker) of the user interface device 250 of the PCD 200, at a generation timestamp. Sound signals including the bit stream may be captured by the microphone 210 of the PCD 200, at block B820, at a receiving timestamp. The PCD 200 may compare the captured signal patterns with the fixed/known signals patterns out the outputted bit stream for a match, as the signals are being captured. The receiving timestamp is set when the match is found. The acceptable match may be 100%, 90%, 80%, 75%, or the like.

At block B830, the PCD 200 may determine the local framework latency by calculating a difference between the generation timestamp and the receiving timestamp of the bit stream. The local framework latency may be approximated to be the difference. At block B840, the PCD 200 may use the determined local framework latency to obtain the actual uplink timestamp (Tts). For example, the satellite devices 120 may convert the delayed uplink timestamps (Ttps1 and Ttps2) to the actual uplink timestamps (Tts) prior to transmitting at block B460. Likewise, the master device 110 may convert the delayed uplink timestamps (Ttpm) to the actual uplink timestamp (Tts) prior to signal processing at block B750.

In some embodiments, the master device 110 and the satellite devices 120 may access whether the ambience noise is below a predetermined threshold in order to execute the processes described herein. The master device 110 and the satellite devices 120 may be configured to capture sound signals with the microphone 210 for a predetermined period of time (e.g., 5 seconds, 10 seconds, and the like). When the energy and/or amplitude of the captured sound signals reach a predetermined threshold, a software module implementing the processes described herein may not be executed for a lack of acceptable ambience. In further embodiments, the output device (e.g., the speaker, the display screen) of the user interface 250 of the master device 110 and the satellite devices 120 may prompt the user to move to a quieter location with audio and/or visual output.

Figure 9:
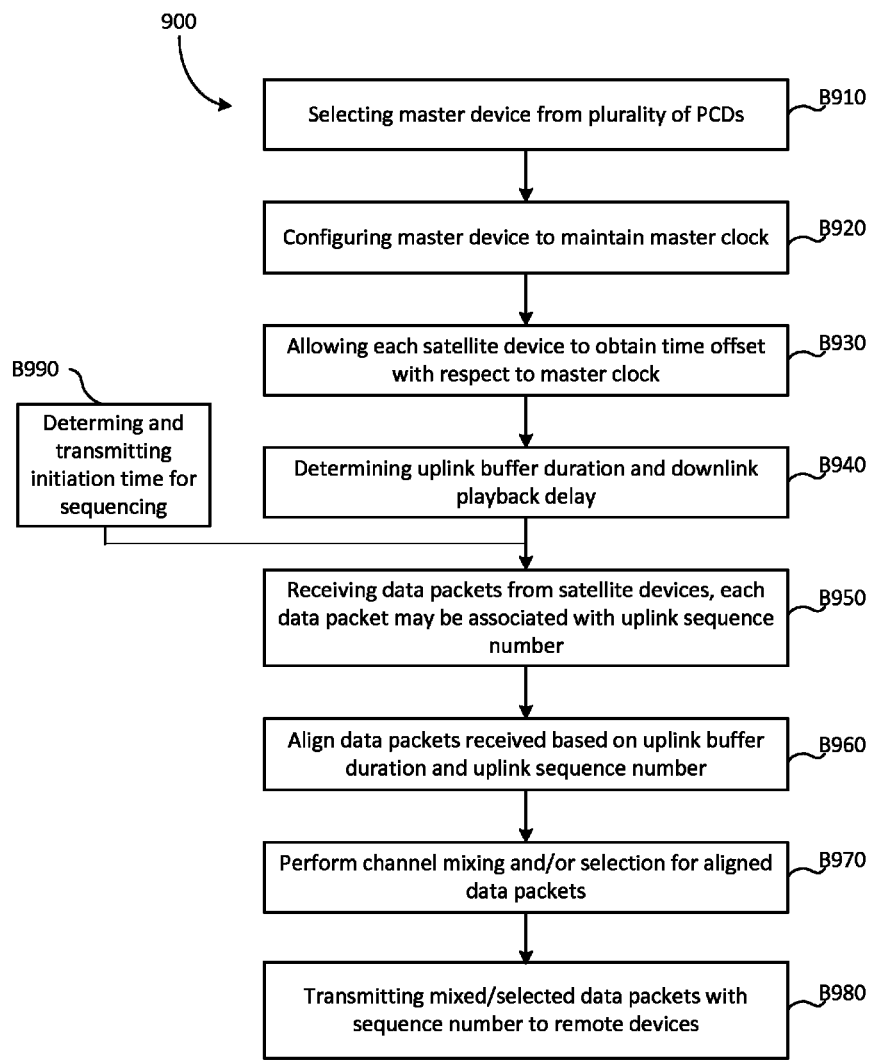
FIG. 9 is a process flowchart diagram illustrating an example of a process for conducting a virtual conference according to various embodiments.

Sequence numbers may also be used for uplink and downlink synchronization processes. FIG. 9 is a process flowchart diagram illustrating an example of a process 900 for conducting a virtual conference according to various embodiments. Referring to FIGS. 1-9, the process 900 may be implemented for the VCS 100, in which at least the master device 110 and the satellite devices 120 may be implemented with the PCD 200. The process 900 may be implemented for the master device 110. Each of blocks B910-B940 may correspond with each of blocks B310-B340.

At block B950, the master device 110 may receive data packets from the satellite devices 120, each data packet received may be associated with an uplink sequence number. The master device 110 may itself generate data packets with the uplink sequence number. Data packets with the same uplink sequence number may be treated similar to data packets with the same uplink timestamp. That is, the data packets with the same uplink sequence number may be aligned at based on the uplink buffer duration, at block B960. The master device 110 may perform channel mixing and/or selection for the uplink data packets aligned with the uplink sequence number, at block B970. At block b980, the master device 110 may transmit the mixed/selected data packets with the sequence number to the remote devices 130 (or additionally, to the satellite devices 120 in the acoustically isolated scenarios).

After block B930 and prior to block B950, the master device 110 may determine an initiation time (according to the master clock) at which the data packets are first to be sequenced (with sequence number=0), at block B990. The initiation time may then be transmitted to the satellite devices 120. Each of the satellite devices 120 may determine the initiation time of the sequencing by converting the received initiation time into its own respective clock using the time offset determined at block B930. Given that a sequence number may be assigned in order for each data packet, data packets from different one of the satellite devices 120 and the master device 110 may be generated at the same time.

Figure 10:
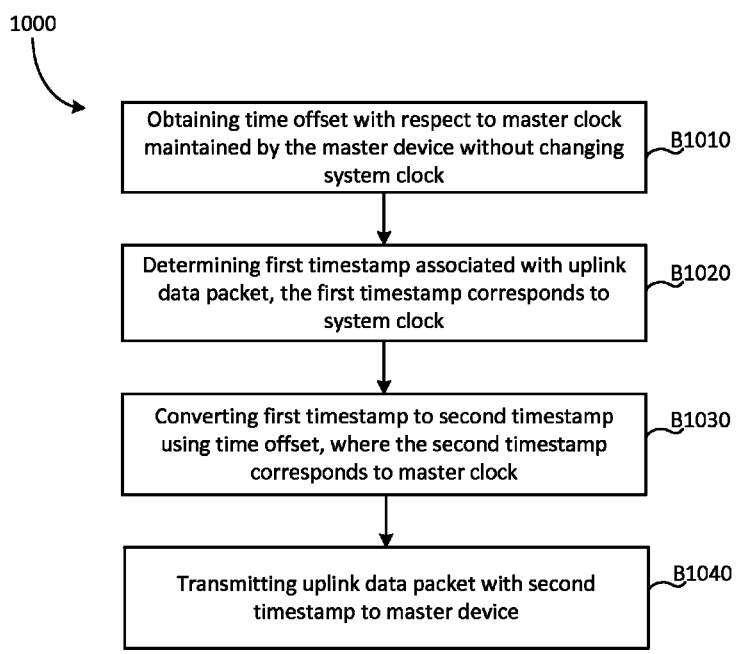
FIG. 10 is a process flowchart diagram illustrating an example of a process for conducting a virtual conference according to various embodiments.

FIG. 10 is a process flowchart diagram illustrating an example of a process 1000 for conducting a virtual conference according to various embodiments. Referring to FIGS. 1-10, the process 1000 may be implemented for the VCS 100, in which at least the master device 110 and the satellite devices 120 may be implemented with the PCD 200. The process 1000 may be used by one (e.g., the satellite device 120a) of the satellite devices 120.

At block B1010, the satellite device 120a may obtain a time offset with respect to the master clock maintained by the master device 110 without changing the system clock of the satellite device 120a. At block B1020, the satellite device 120a may determine a first timestamp associated with the uplink data packet. The first timestamp may correspond to the system clock of the satellite device 120a. Next, the satellite device 120*a* may convert the first timestamp to a second timestamp using the time offset, at block B1030. The second timestamp may correspond to the master clock. In other words, the second timestamp is the uplink timestamp, which is adjusted for the local framework latency as described herein. Next, the satellite device 120*a* may transmit the uplink data packet with the second (uplink) timestamp to the master device 110, at block B1040.

Furthermore, after the active conference session has initiated for the satellite device 120*a*, the satellite device 120*a* may receive the downlink playback delay from the master device 110 (e.g., at block B460). The satellite device 120*a* may receive the downlink data packet and the downlink timestamp associated with the downlink packet from the master device 110 (e.g., at block B440). The satellite device 120*a* may then output the downlink data packet based on the downlink timestamp and the downlink playback delay (e.g., at block B450).

While the time offset mechanisms, the uplink buffer duration selection, the downlink playback delay selection, and the uplink data packets (and the associated timestamp) transmission are described with respect to the satellite devices, one of ordinary skill in the art can appreciate that similar mechanisms may be extended to the remote devices 130 as well, provided that the master device 110 may be capable to be in communication with the remote devices 130 via the network 155 (directly without going through the bridge 140 or indirectly through the bridge 140).

As referred to herein, uplink data packets, downlink data packets, data packets, frames, and the like may refer to any type of audio packets/frames or video packets/frames used for the VCS 100.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a DSP, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Various modifications to embodiments described herein will be readily apparent to those skilled in the art, and the generic principles defined herein may be applied to some embodiments without departing from the spirit or scope of the disclosure. Thus, the present disclosure is not intended to be limited to the embodiments shown herein but is to be accorded the widest scope consistent with the following claims and the principles and novel features described herein.

What is claimed is:

1. A method for providing a virtual conference using a master device implemented with a personal communication device (PCD), comprising:

determining, by a processor of the master device, a latency for each of a plurality of satellite devices connected to the master device;

determining, by the processor of the master device, an uplink buffer duration based, at least in part, on a difference between a highest latency and a lowest latency among the plurality of satellite devices;

determining, by the processor of the master device, a processing time for an uplink data packet received from each of the plurality of satellite devices, wherein the processing time is based, at least in part, on the uplink buffer duration; and performing, by the processor of the master device, signal processing at the determined processing time for the received uplink data packets.

2. The method of claim 1, further comprising receiving the uplink data packet and an uplink timestamp associated with the uplink data packet from each of the plurality of satellite devices, wherein determining the processing time further comprises determining a processing time for the uplink data packet further based, at least in part, on the uplink timestamp associated with the uplink data packet.

3. The method of claim 2, wherein the latency is determined by determining a generation timestamp and a receiving timestamp of a previously-generated uplink data packet or a test packet.

4. The method of claim 3, wherein the generation timestamp is the uplink timestamp of the previously-generated uplink data packet or a test packet.

5. The method of claim 1, wherein the uplink buffer duration is a predetermined margin plus the difference between the highest latency and the lowest latency.

6. The method of claim 5, wherein the predetermined margin is a frame duration.

7. The method of claim 2, further comprising generating, by the processor of the master device, an uplink data packet at the same uplink timestamp, wherein the determined processing time corresponds to the uplink data packet generated by the master device.

8. The method of claim 7, wherein the signal processing is performed at the determined processing time for the received uplink data packets received from the satellite devices and the uplink data packet generated by the master device.

9. The method of claim 1, wherein the signal processing comprises at least one of channel selection or channel mixing of at least the uplink data packets received from the satellite devices.

10. The method of claim 3, wherein the determined processing time is the uplink timestamp plus the uplink buffer duration.

11. The method of claim 3, wherein:
the latency comprises a network-related latency and a local framework latency; and
the uplink timestamp is adjusted for the local framework latency.

12. The method of claim 11, wherein the local framework latency may be determined by:
outputting an audio bit stream at a time determined by the generation timestamp;
capturing sound signals including the bit stream outputted at a time determined by the receiving timestamp; and
determining the local framework latency based on a difference between the receiving timestamp and the generation timestamp.

13. The method of claim 12, wherein the audio bit stream is captured at the receiving timestamp when at least a portion of a pattern of the captured sound signals matches with a pattern of the outputted bit stream at the receiving timestamp.

14. The method of claim 1, further comprising:
determining an ambience noise level associated with the master device; and
proceeding with the latency determination, the uplink buffer duration determination, the uplink data packet reception, the processing time determination, and the signal processing when the ambience noise level is below a predetermined threshold.

15. The method of claim 14, further comprising:
prompting the user to move to a quiet location when the ambience noise level is above the predetermined threshold.

16. The method of claim 1, wherein the uplink data packet is at least one of an audio packet or video packet.

17. A non-transitory computer-readable storage medium storing instructions that, when executed by a processor of a master device implemented with a personal communication device (PCD), cause the master device to:
determine a latency for each of a plurality of satellite devices connected to the master device;
determine an uplink buffer duration based, at least in part, on a difference between a highest latency and a lowest latency among the plurality of satellite devices;
determine a processing time for an uplink data packet received from each of the plurality of satellite devices, wherein the processing time is based, at least in part, on the uplink buffer duration; and
perform signal processing at the processing time for the received uplink data packets.

18. The non-transitory computer-readable storage medium of claim 17, wherein execution of the instructions causes the master device to further:
receive the uplink data packet and an uplink timestamp associated with the uplink data packet from each of the plurality of satellite devices, wherein the determination of the processing time further comprises a determination of a processing time for the uplink data packet further based, at least in part, on the uplink timestamp associated with the uplink data packet.

19. The non-transitory computer-readable storage medium of claim 18, wherein the latency is determined by a determination of a generation timestamp and a receiving timestamp of a previously-generated uplink data packet or a test packet.

20. The non-transitory computer-readable storage medium of claim 19, wherein the generation timestamp is the uplink timestamp of the previously-generated uplink data packet or a test packet.

21. The non-transitory computer-readable storage medium of claim 17, wherein the uplink buffer duration is a predetermined margin plus the difference between the highest latency and the lowest latency.

22. The non-transitory computer-readable storage medium of claim 18, wherein execution of the instructions causes the master device to further:
generate an uplink data packet at the same uplink timestamp, wherein the determined processing time corresponds to the uplink data packet generated by the master device.

23. The non-transitory computer-readable storage medium of claim 22, wherein signal processing is performed at the determined processing time for the received uplink data packets received from the satellite devices and the uplink data packet generated by the master device.

24. The non-transitory computer-readable storage medium of claim 17, wherein the signal processing comprises at least one of channel selection or channel mixing of at least the uplink data packets received from the satellite devices.

25. An apparatus comprising:
a processor; and
a memory storing instructions that, when executed by the processor, cause the apparatus to:
determine a latency for each of a plurality of satellite devices connected to the apparatus;

determine an uplink buffer duration based, at least in part, on a difference between a highest latency and a lowest latency among the plurality of satellite device;

determine a processing time for an uplink data packet received from each of the plurality of satellite devices, wherein the processing time is based, at least in part, on the uplink buffer duration; and perform signal processing at the processing time for the received uplink data packets.

26. The apparatus of claim 25, wherein execution of the instructions causes the apparatus to further:

receive the uplink data packet and an uplink timestamp associated with the uplink data packet from each of the plurality of satellite devices, wherein the determination of the processing time further comprises a determination of a processing time for the uplink data packet further based, at least in part, on the uplink timestamp associated with the uplink data packet.

27. The apparatus of claim 26, wherein the latency is determined by a determination of a generation timestamp and a receiving timestamp of a previously-generated uplink data packet or a test packet.

28. The apparatus of claim 27, wherein the generation timestamp is the uplink timestamp of the previously-generated uplink data packet or a test packet.

29. The apparatus of claim 25, wherein the uplink buffer duration is a predetermined margin plus the difference between the highest latency and the lowest latency.

30. An apparatus comprising:

means for determining a latency for each of a plurality of satellite devices connected to a master device;

means for determining an uplink buffer duration based, at least in part, on a difference between a highest latency and a lowest latency among the plurality of satellite devices;

means for determining a processing time for an uplink data packet received from each of the plurality of satellite devices, wherein the processing time is based, at least in part, on the uplink buffer duration; and means for performing, by the processor of the master device, signal processing at the determined processing time for the received uplink data packets.

* * * * *